July 28, 1959 H. J. HANSEN 2,896,977
BAYONET LOCK COUPLING
Filed Dec. 30, 1954

INVENTOR.
HOWARD J. HANSEN
BY
ATTORNEYS

United States Patent Office 2,896,977
Patented July 28, 1959

2,896,977

BAYONET LOCK COUPLING

Howard J. Hansen, Bay Village, Ohio, assignor to The Hansen Manufacturing Company, Cleveland, Ohio, a corporation of Ohio Application December 30, 1954, Serial No. 478,834

1 Claim. (Cl. 285—277)

This invention relates to improvements in bayonet lock couplings, particularly couplings in which are incorporated automatic valves for preventing loss of pressure fluid when the coupling is disconnected. As illustrated herein both members of the coupling have automatic valves, but the invention contemplates also couplings in which one member only is provided with such a valve.

One of the objects of the invention is the provision of a coupling of the character stated wherein a bayonet lock of simple form is used to hold the two members of the coupling against accidental disengagement.

Another object is the provision of bayonet lock pins of novel construction such that they are retained against accidental loss whenever the two members of the coupling are joined together.

Other objects and features of novelty will appear as I proceed with the description of that embodiment of the invention which, for the purposes of the present application, I have illustrated in the accompanying drawing, in which Fig. 1 is a central longitudinal sectional view of a coupling embodying the invention, the members of the coupling being shown in coupled relation;

Figures 1, 2, 3, 4:
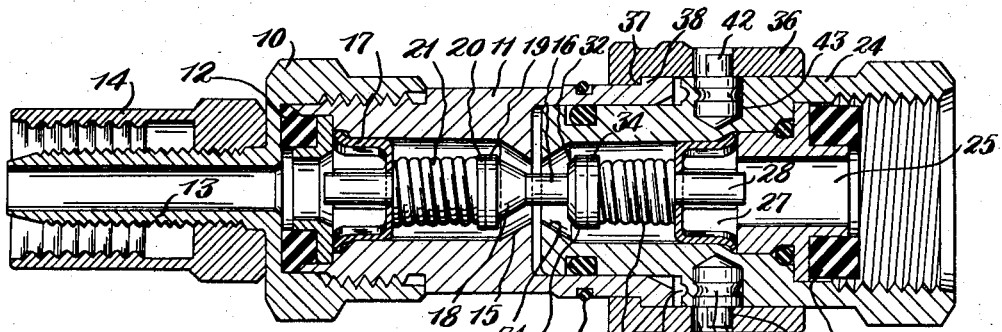
Fig. 2 is a central longitudinal sectional view of the male member of the coupling in its disconnected condition.
Fig. 3 is an end view looking in the direction of arrow 3 of Fig. 2.
Fig. 4 is a fragmental detail elevational view with the members of the coupling in coupled relation.

In Fig. 1 the female member of the coupling is illustrated as comprising castings 10 and 11 which are threadably joined together in a manner to compress a sealing gasket 12. The casting 10 may comprise a hollow shank 13 exteriorly threaded to take a hose securing connection 14.

Within the hollow interior of casting 11 there is a valve seat 15. A cooperating valve piece comprises a shank 16 the rear end of which is guided in a sheet metal spider 17. Somewhat behind the forward end of shank 16 there is a frusto-conical element 18 adapted to cooperate with the seat 15, which functions to center the valve piece when it moves toward closed position. The valve piece also comprises a soft rubber gasket 19 backed by a metal collar 20. Between this collar and the spider 17 there is a spiral spring 21, shown compressed in the drawing.

The male member 24 of the coupling is interiorly threaded for connection with a fluid pressure line. A flanged tubular element 25 is disposed within the casting 24 and a rubber gasket 26 may be used to provide a seal. Bearing against the tubular element 25 there is a sheet metal spider 27 which provides a guide for the stem 28 of a valve piece 29 embodying a gasket 30 which is adapted to engage a seat 31 similar to seat 15, as illustrated in Fig. 2. A spiral spring 33 bearing against the spider 27 at one end and against a metal collar 34 at the other end urges the valve piece forward. The metal head 32 of this valve contacts shank 16 of the other valve when the coupling is assembled, whereby both valves are opened in opposition to the two springs 21 and 33. However, it will be appreciated by those skilled in the art that one or the other of the two valves could be omitted, the retained valve then being pushed off its seat by a projecting part in the other member so constructed as not to interfere with the passage of fluid.

On the casting 11 there is a projecting cylindrical overhang which in the illustrated case is a sleeve 36, engaging shoulders 37 and 38 being provided to prevent the sleeve from moving to the right beyond the position shown in Fig. 1. This element 36 is provided with two or more longitudinal slots 39 extending rearwardly from the forward extremity of the element, preferably in a direction parallel to the axis of the coupling. At its rear end each slot has an offset portion 40 which may be at substantially right angles to the portion 39 and which is shaped to provide a cavity 41 that extends forwardly somewhat beyond the rear end of the portion 39.

Pins 42 mounted in the male member 24 are of a diameter to pass through the slots 39, 40 and take into the cavities 41. When the coupling is being assembled, that is when the coupling members are being pushed together, each pin 42 is caused to move through a slot 39 and then the sleeve 36 is rotated sufficiently to cause the pin to travel sidewise through the offset portion 40 of the slot, whereupon the operator may release his hold upon the two members and the spring or springs of the coupling members will cause the pins 42 to enter the cavities 41, where they will be held by the spring pressure against any accidental disengagement of the coupling members.

In accordance with the invention the pins 42 may be of special construction. As shown herein each pin has a base portion 43 of larger diameter than the width of slot 39, 40. The base portion is mounted in a radial bore 44 so that the base is flush with the surface of the male member, or at least does not extend outwardly beyond the surface of that member. Suitable means are provided to retain each pin base in its bore. For this purpose the base may have an annular groove 45, and when it is in place an operator may make an indentation 46 with a prick punch to drive a small metal projection into the groove 45. The base 43, being of greater diameter than the slot 39, 40, is held in place by the sleeve 36 at all times when the coupling members are joined, so that there is no possibility of the coupling being disabled by the loss of a bayonet pin when the coupling is in assembled condition. A snap ring 47 in combination with shoulders 37 and 38 holds the sleeve against accidental axial movement.

Having thus described my invention, I claim:

In a pipe coupling, first and second coupling members, spring means tending to force the members of the coupling apart, a sleeve mounted upon and projecting forward from the first of said members, a plurality of radial pins set into the second member, the projecting portion of said sleeve slidably receiving a portion of said second member and having bayonet slot means therein adapted to receive said pins, each of said slot means having a longitudinal portion and a lateral offset portion, each offset portion being shaped to provide a cavity extending generally parallel to the longitudinal portion in the direction toward the open end of the slot, each of said pins being a separate element having a base radially insertable into a bore in the second member, said base and said bore having laterally interlocking deformed means normally preventing radial movement of said pin, the outer end of said base being substantially flush with the said portion of said second member, said pin having an extension portion projecting radially from said outer surfaces of said base and being reduced in size with respect to said base and said bore forming a shoulder at said outer end, said bore being larger than the offset portions of said slot means and said extension portion of said pins being of less size than said slot means whereby said second member may be inserted into the projecting portion of said sleeve with the extension portions of the pins passing axially and circumferentially in said slot means and whereby said shoulder means will underlie said sleeve member adjacent said slot means and prevent accidental loss of said pin means.

References Cited in the file of this patent

UNITED STATES PATENTS

| | | |
|---|---|---|
| 1,128,634 | Talbot | Feb. 16, 1915 |
| 1,145,885 | Forst | July 13, 1915 |
| 1,865,932 | MacIndoe | July 5, 1932 |
| 2,660,456 | Meddock | Nov. 24, 1953 |

FOREIGN PATENTS

| | | |
|---|---|---|
| 942,072 | France | Sept. 13, 1948 |
| 944,243 | France | Nov. 2, 1948 |
| 463,741 | Italy | May 30, 1951 |
| 872,900 | Germany | Apr. 9, 1953 |